Oct. 10, 1933.  F. G. THWAITS  1,929,761
MANHOLE CLOSURE
Filed Feb. 2, 1931  2 Sheets-Sheet 1

Inventor
Frederick G. Thwaits

Oct. 10, 1933.   F. G. THWAITS   1,929,761
MANHOLE CLOSURE
Filed Feb. 2, 1931   2 Sheets-Sheet 2
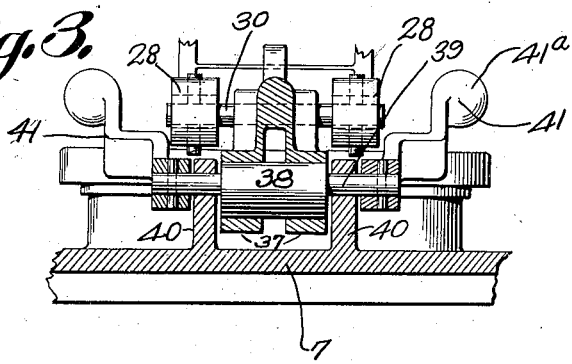
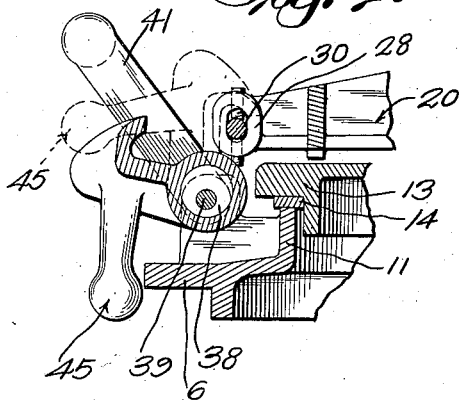
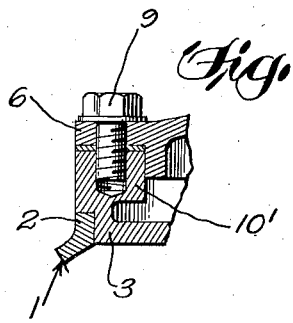
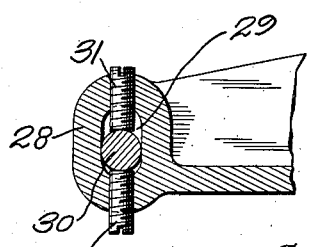
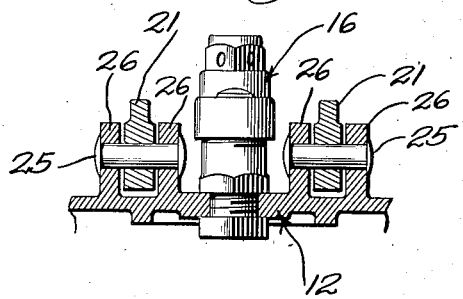
Inventor
Frederick G. Thwaits
By
Attorneys Patented Oct. 10, 1933

1,929,761

UNITED STATES PATENT OFFICE 1,929,761

MANHOLE CLOSURE

Frederick G. Thwaits, Wauwatosa, Wis., assignor to The Heil Co., Milwaukee, Wis., a corporation of Wisconsin Application February 2, 1931. Serial No. 512,793

6 Claims. (Cl. 220—57)

This invention relates to manhole covers designed for use with oil tank trucks and for other similar applications.

One of the principal objects of the present invention is to provide a manhole cover structure having a filling opening and equipped with a readily releasable closure plate for the filling opening. Organized with the plate is operating and locking mechanism which is so constituted as to be capable of securely and rigidly holding and locking the closure plate in closed position and in hermetic sealing engagement with the gasket interposed between the closure plate and the seat provided therefor around the filling opening. The locking mechanism is of such character as to preclude accidental displacement and to more firmly maintain its locked position under the influence of force tending to displace the closure plate. While having these advantages the locking mechanism is quickly releasable by merely pulling a lever through a short distance. The tedious and slow operation of engaging and disengaging threaded parts is avoided.

Another object is to provide a closure structure for the filling opening of a manhole cover and embodying adjustable features rendering its operating and locking mechanism capable of applying proper compression to and of having effective sealing engagement with the gasket so as to provide a proper and effective seal and also to provide for taking up of wear.

A further object of the invention is to provide a novel mounting and operating means for the closure plate which permanently organizes the closure plate with the manhole cover thereby precluding dropping or losing of the same or damaging interference between the closure plate and the tank wall and yet permits the plate to adjust itself to inequalities in gasket thicknesses or to imperfections of machining to the end of obtaining a proper seal. Further, the arrangement is such that the closure plate and its associated parts are self supporting in open position and in such position are to one side of the filling opening and entirely out of the way.

Other objects and advantages reside in certain novel features of the construction, arrangement and combination of parts which will be hereinafter more fully described and particularly pointed out in the appended claims, reference being had to the accompanying drawings, forming a part of this specification, and in which:

Figure 3 is a fragmentary detail sectional view taken on line 3—3 of Figure 2, with parts shown in elevation for the sake of simplicity in illustration;

Figure 4 is a fragmentary sectional view taken in the same plane as the left hand end of Figure 2 but showing a different position of the parts;

Figure 5 is a fragmentary sectional view taken on line 5—5 of Figure 1, parts being shown in elevation for the sake of simplicity in illustration;

Figure 6 is a similar fragmentary sectional view taken on line 6—6 of Figure 1; and Figure 7 is a fragmentary sectional view illustrating how the main manhole cover plate is secured to the ring or bushing of the tank opening.

Figure 1:
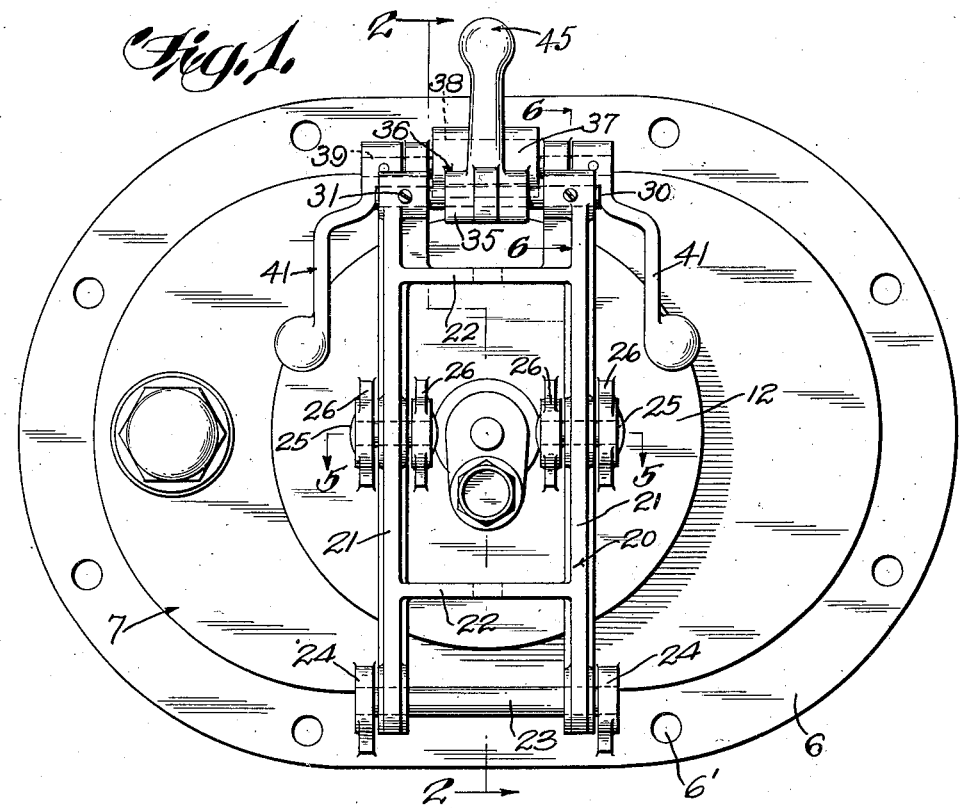
Figure 1 is a plan view showing a manhole cover structure having a closure plate and operating and locking mechanism therefor embodying the present invention.
Figure 2:
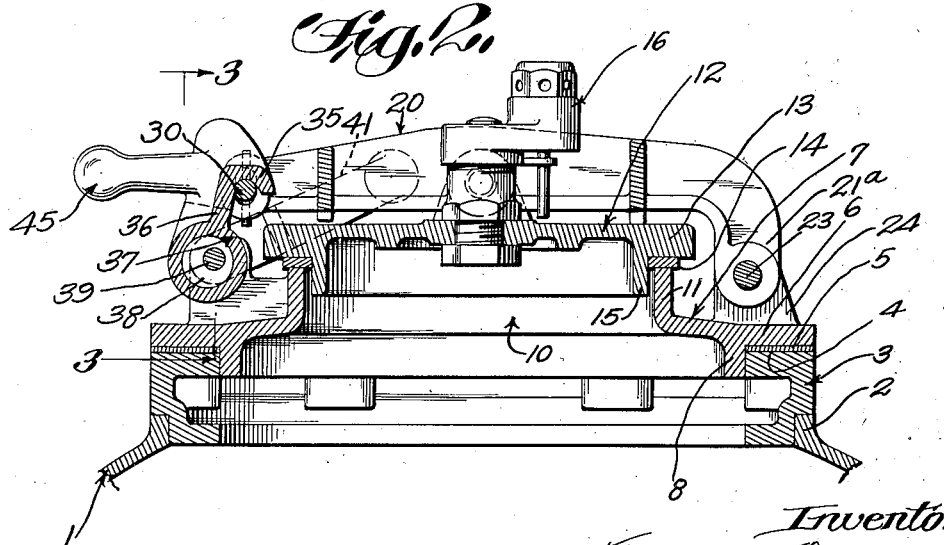
Figure 2 is a view in transverse vertical section taken approximately on line 2—2 of Figure 1, parts being shown in elevation for the sake of simplicity in illustration.

Referring to the drawings, the numeral 1 designates a fragment of a tank having a flanged manhole opening as indicated at 2 (see Figure 2). Interfiitted with the flange of the opening 2 is a grooved or rabbetted lower marginal edge of a flange or bushing 3 which may be a casting and have the form of an oblong ring-like structure. This bushing 3 may be welded or otherwise secured to the flanged margin of opening 2. The upper surface of the bushing 3 is machined to provide a seat 4 for a gasket 5. On the gasket 5 the marginal flange 6 of a main manhole cover 7 is adapted to seat. Adjacent the flange 6 the manhole cover 7 also has a depending flange 8 designed to fit snugly within the upper portion of the bushing 3. As shown in Figure 1, the flange 6 is provided with spaced bolt holes 6' and, as illustrated in Figure 7, bolts 9 are utilized to firmly clamp the main manhole cover plate in position, the bolts 9 threading into sockets 10' which may be integrally formed with the bushing 3.

Centrally, the main manhole cover plate is provided with a filling opening 10 surrounded by an upstanding neck 11. A readily removable closure plate 12 is provided for closing the opening 10 when desired. The closure plate 12 is provided with a marginal flange 13 adapted to engage a gasket 14 resting on the seat provided by the upper end surface of the neck 11. Adjacent the flange 13 the closure plate 12 is provided with a depending flange 15 designed to project down into the neck 11. A vent 16, which may embody the construction shown in Patent 1,637,076, granted July 26, 1927, to Julius P. Heil and Arthur Borchardt, may be associated with the closure plate.

A combined clamping member and carrier designated generally at 20 is provided and preferably has spaced side members 21 connected by integral cross members 22. The primary purpose of the element 20 is to clamp and securely hold the closure plate 12 in closed position but as will hereinafter more clearly appear, it also functions as a carrier in that it facilitates opening of the closure plate and provides for the support of the closure plate in open position. At one end the side members 21 are downturned as at 21ª (see Figure 2) and the downturned ends are pivotally mounted on a supporting pin 23 carried by lugs 24 which may be integrally formed with the main manhole cover plate. Intermediate their ends the side members 21 are pivotally connected by means of pivot pins 25 to the members of pairs of upstanding lugs 26 integral with the closure plate 12 and arranged so that two such lugs 26 are disposed in embracing relation to each side member 21 of the swingable carrier (compare Figures 1 and 5). The forward end of each side member 21 of the swingable carrier 20 terminates in an enlarged bearing 28 having a vertically elongated slot or opening 29 (see Figure 6). A cross pin 30 extends between the bearings 28 and has its end portions received in the slots 29 thereof. Opposed and vertically alined screws 31 and 32 are extended through and engaged in internally threaded openings provided in the upper and lower portions of the enlarged bearings and the inner ends of these screws engage the end portions of cross pin 30 to determine its vertical position and to support and secure it in various vertical adjustments.

Cooperable with the cross pin 30 is the hooked end 35 of a latching link 36, the lower end of which link 36 has an integral eccentric strap 37 operatively fitted around an eccentric 38 keyed or fixed to a shaft 39. The shaft 39 is rotatably supported in bearing lugs 40 which may be integrally formed with the main manhole cover plates 7, as illustrated in Figure 3. And the ends of this shaft 39 project beyond the lugs 40 and are pinned or keyed to operating levers or operating handles 41 which are of the angular construction shown so that the knobs 41ª at their free ends will clear the carrier. The latching link 36 is preferably provided with a weighted arm 45 as shown to advantage in Figures 1, 2 and 4.

With this construction, when the closure plate 12 is in closed position the parts are disposed as shown in Figures 1 and 2 with the carrier or clamping member 20 urged forcibly downward and forcing the closure plate 12 into engagement with its gasket 14 thereby properly compressing the gasket 14 and causing it to have effective sealing engagement with its seat and with the flange 13 of the closure plate. The carrier 20 or clamping member 20 is urged downwardly and securely held in position by the action of the eccentric 38 which, as shown in Figure 2, is just beyond the lower limit of its throw so that the latching link 36 acts through its hook-shaped end 35 to pull the cross pin 30 and the carrier or clamping member downwardly. The extent to which the carrier or clamping member 20 is pulled downwardly is determined by the throw of the eccentric and by the position of the pin 30. As pointed out above, the pin 30 is adjustable under the control of screws 31 and 32 thereby facilitating the adjustment of the parts in the first instance and providing for the take-up of wear. With the eccentric 38 in the cover securing position shown in Figure 2 the operating levers 41 engage the margins of the closure plate and as the eccentric 38 is just beyond lower dead center the reaction of the gasket and of the other elements tends to more firmly hold the parts in locked position. The cover plate 12 due to its pivotal connection to the carrier 20 is self-centering to compensate for lack of uniformity in gasket thicknesses or slight inaccuracies in the other parts.

The closure 12, when brought to closed position, may be readily secured by swinging the latching link in a clockwise direction as viewed in Figure 4 until it is hooked and overlies the pin 30 and while holding the link so positioned, swinging the levers 41 over to the position shown in Figures 1 and 2.

The cover may be quickly and easily opened by pulling the levers 41 from the position shown in dotted lines in Figure 2 to the position shown in full lines in Figure 4, as this movement of the levers rotates the eccentric 38 and turns it in a counter clockwise direction to the upper limit of its throw as shown in Figure 4. This raises the latching link 36 until its hooked end clears the pin 30, at which time the weighted arm 45 automatically swings the latching link around to the position shown in Figure 4. In other words, the latch is self-releasing upon pulling of the levers 41 to releasing position. The carrier 20 may then be grasped and swung upwardly and to one side of the opening 10 and, of course, carries the closure plate 12 with it. When the carrier is raised or opened its angled ends 21ª abut the margin of the main manhole cover plate 7 to support the carrier and the closure 12 in an upwardly and outwardly inclining position, that is, the weight of the parts and the coaction of the angled end 21ª and the cover 7 maintain the closure and carrier open and out of the way.

The invention claimed is:

1. A manhole cover having a filling opening, a closure therefor, a clamping member overlying and cooperable with the closure and having one end pivotally connected to the manhole cover, a cross pin adjustably supported at the other end of the carrier, a latching link engageable with the cross pin and a manually eccentric for controlling the latching link.

2. In combination with a manhole structure having a removable closure, a combined carrier and clamping member overlying the closure and pivotally interconnected therewith, means for pivotally interconnecting one end of said member with said manhole structure, and means carried by said manhole structure and cooperable with the opposite end of said member for pulling the member downwardly toward the manhole structure to cause it to press the closure downward and secure the same in closed position.

3. In combination with a manhole structure having a removable closure, a combined carrier and clamping member overlying the closure and pivotally interconnected therewith, means for pivotally interconnecting one end of said member with said manhole structure, a keeper structure at the opposite end of said member, a latching link cooperable with the keeper structure and a manually operable eccentric mounted on said manhole structure and cooperable with said latching link to cause the same to pull downwardly on the keeper and on said member to cause said member to press said closure downward and to hold the same in closed position.

4. In combination with a manhole structure having a removable closure, a clamping member extending across and overlying said closure, means for positively and pivotally interconnecting said member and said closure, means for pivotally interconnecting said member at one end to said manhole structure, and releasable clamping and latching means between the other end of said member and said manhole structure and operable when moved to clamping and latching position to pull downwardly on said member to force the closure to and securely hold the same in closed position.

5. In combination with a manhole structure having a removable closure, a combined carrier and clamping member overlying the closure and pivotally interconnected therewith, means for pivotally interconnecting one end of said member with said manhole structure, an adjustable keeper on the opposite end portion of said member, a lever operated eccentric mounted on said manhole structure adjacent said keeper and a latching link interconnected with and controlled by said eccentric and cooperable with said keeper for pulling said member downwardly to cause it to force the closure to closed position and to securely hold the same in such position.

6. In combination with a manhole structure having a removable closure, a combined clamping member and carrier including spaced side members and cross members connecting said side members, means pivotally connecting the intermediate portions of said side members with said closure, means pivotally interconnecting said side members at one end with said manhole structure, a cross pin carried by said side members at the opposite ends thereof, a manually operable eccentric mounted on said manhole structure adjacent said cross pin, and a latching link controlled by said eccentric and cooperable with said cross pin to pull said member downwardly to cause it to force the closure to and hold the same in closed position.

FREDERICK G. THWAITS.